(12) United States Patent
Aiba

(10) Patent No.: US 7,234,272 B2
(45) Date of Patent: Jun. 26, 2007

(54) RAISING POTS FOR VEGETABLE SEEDLINGS

(76) Inventor: Toshiyuki Aiba, 18-73, Nishikiori, 1-chome, Otsu-shi, Shiga (JP)

( * ) Notice: Subject to any disclaimer, the term of this patent is extended or adjusted under 35 U.S.C. 154(b) by 106 days.

(21) Appl. No.: 10/535,397

(22) PCT Filed: Nov. 18, 2002

(86) PCT No.: PCT/JP02/12026

§ 371 (c)(1),
(2), (4) Date: May 18, 2005

(87) PCT Pub. No.: WO2004/045271

PCT Pub. Date: Jun. 3, 2004

(65) Prior Publication Data

US 2006/0086046 A1    Apr. 27, 2006

(51) Int. Cl.
*A01G 9/02* (2006.01)
(52) U.S. Cl. ..................................... 47/65.7
(58) Field of Classification Search ............. 47/67.5, 47/65.5
See application file for complete search history.

(56) References Cited

U.S. PATENT DOCUMENTS 4,972,627 A * 11/1990 Hori et al. .................... 47/64

2006/0032122 A1 * 2/2006 Chang .......................... 47/58.1

FOREIGN PATENT DOCUMENTS

| CN | 1268283 A | * | 10/2000 | |
|----|-----------|---|---------|---|
| EP | 355250 A1 | * | 2/1990 | 47/74 |
| EP | 384133 A1 | * | 8/1990 | 47/74 |
| EP | 1568269 A1 | * | 8/2005 | |
| JP | 2249427 A | * | 10/1990 | 47/74 |
| JP | 3019628 A | * | 1/1991 | 47/74 |
| JP | 2001231372 A | * | 8/2001 | |
| JP | 2002262671 A | * | 9/2002 | |
| JP | 2005333850 A | * | 12/2005 | |
| WO | WO0182682 A1 | * | 8/2001 | |

* cited by examiner

Primary Examiner—Francis T. Palo
(74) Attorney, Agent, or Firm—Antonelli, Terry, Stout & Kraus, LLP.

(57) ABSTRACT

Raising pots for vegetable seedlings are produced by molding a mixture including a boiled fiber material prepared by boiling bamboo fiber with fiber of a grass plant such as reed, an auxiliary material comprising at least one member selected from among a carbonized vegetable material prepared by carbonizing a tree-free material, a calcium-based waste powder such as bone metal and a chicken manure powder and a small amount of urea optionally together with a silicon dioxide powder.

6 Claims, 4 Drawing Sheets

RAISING POTS FOR VEGETABLE SEEDLINGS

INDUSTRIAL FIELD OF THE INVENTION

Figure 1:
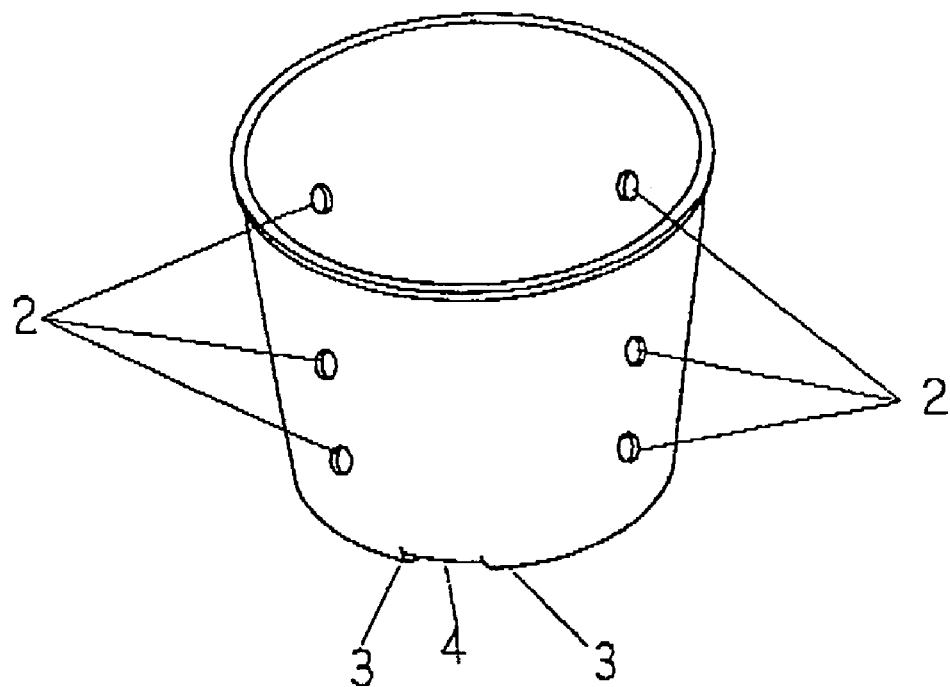
Figure 2:
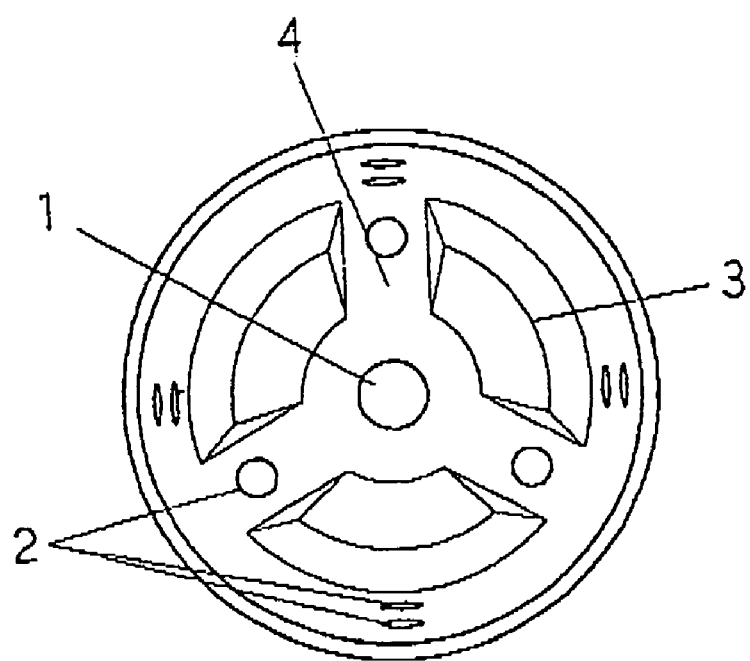
Figure 3:
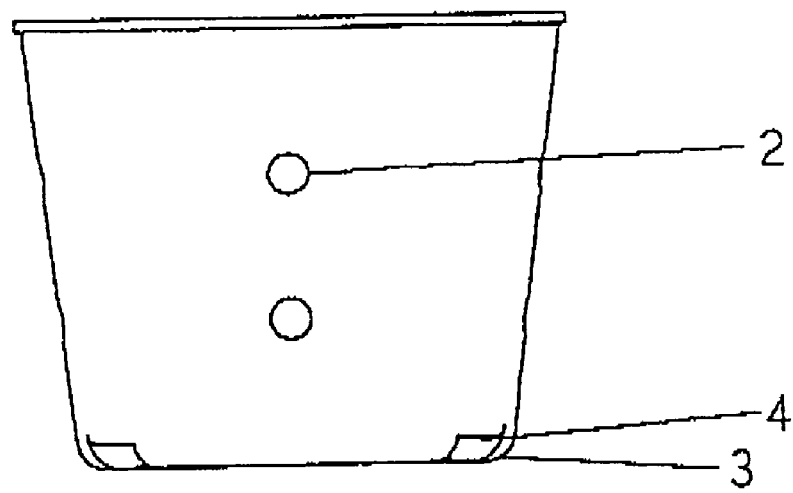
Figure 4:
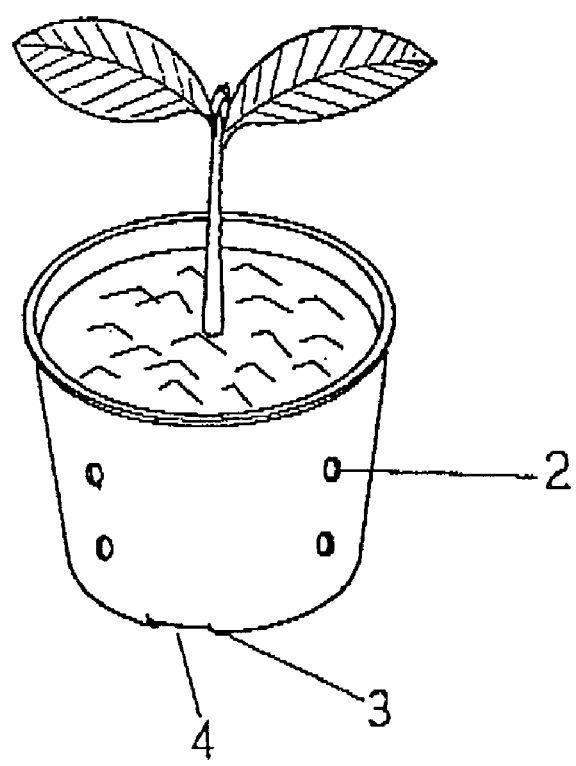
Figure 5:
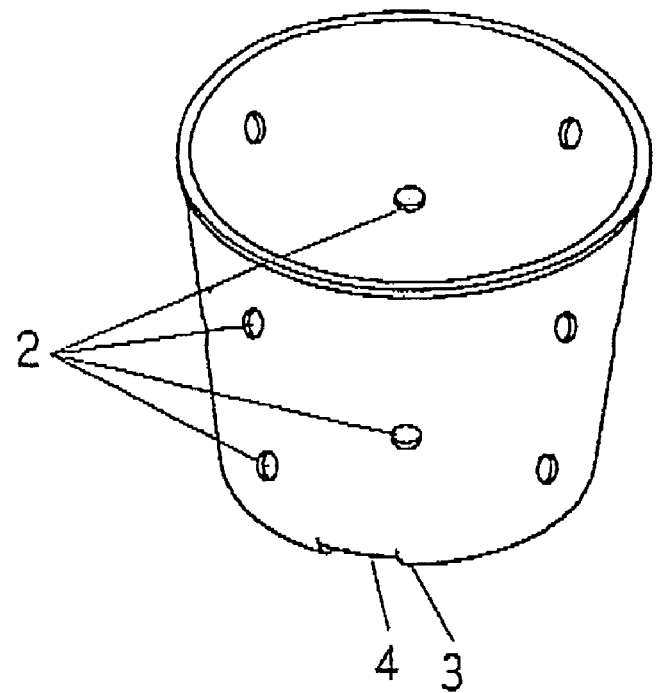
Figure 6:
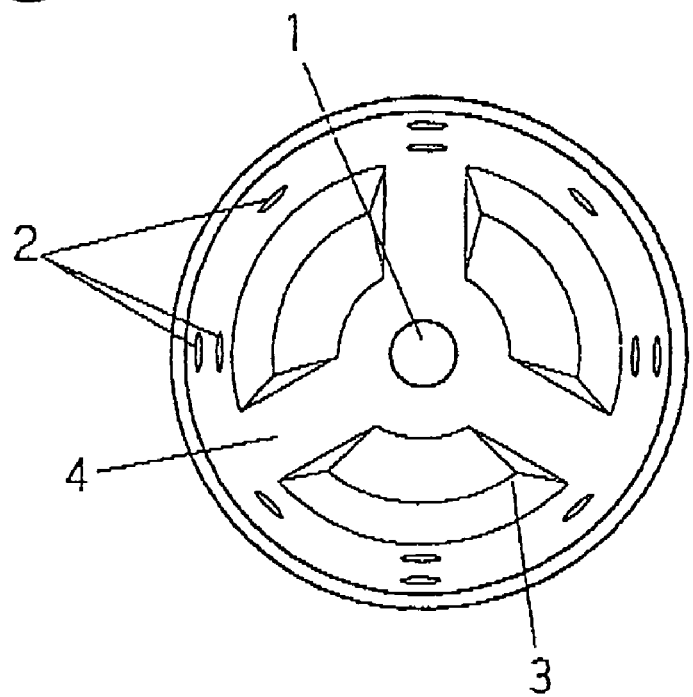

The present invention relates to a seedling pot for raising fruit crop seedlings such that a main material and a supplementary material added thereto do constitute the seedling pot. The main material is chosen herein from nonwoody fibers, with the supplementary material facilitating the desired healthy growth of any particular seedlings, also resolving the problems of environmental pollution.

PRIOR ART

As known widely, the prior art seedling pots have usually been flower-pot miniatures molded using a proper plastics sheet such as a polyvinyl chloride resin. Those plastics pots are cheap but cost much labor because the seedlings should be removed from the pots, prior to transplantation to a farm or larger pots. A clod of soil around the root of each seedling is likely to be broken to injure the root, thereby adversely affecting growth of the seedling thus transplanted. The burning of those discarded seedling pots has undesirably caused environmental pollution. In some proposals that have been made in view of these problems and are going to be employed in the art, certain agricultural and/or forestry wastes are salvaged to manufacture seedling paper-made pots.

After use of such papery pots already proposed and economically made of those natural wastes, they can be left on and/or in the earth. They will undergo a fast biological decomposition in situ, resolving one of the drawbacks inherent to the prior art plastics pots. Thus, they may be expected to be advantageous insofar as assessed on their economical and environmental merits. Material composition and configuration of such papery pots have however not been researched, though they must affect on growth of the respective botanical kinds of seedlings. No attention has been paid on what requirements the papery pots should meet for raising the particular seedlings that might be root crops, fruit crops (i.e., fructifying vegetables) or green foliar vegetables. Under such circumstances, none of the already proposed type papery pots did prove useful to raise all the kinds of seedlings. Therefore, it has been long and eagerly demanded to develop a seedling pot not only advantageous economically and environmentally but also capable of meeting particular requirements which any desired type of seedlings being raised would show.

DISCLOSURE OF THE INVENTION

An object of the present invention is therefore to provide a seedling pot particularly adapted for use to raise the seedlings of farm products that are generally called fruit crops including tomatoes, cucumbers, eggplants, melons, watermelons strawberries and the like. The seeding pot, that will be mass-produced herein using inexpensive nonwoody plant materials and certain other materials not widely utilized in this field, has to be designed and composed in principle such that growth of leaves stems and the like important organs will be facilitated. Also, this seedling pot that can inexpensively be manufactured herein as suggested above has to be tenacious, safe and harmless to handle. When discarding this pot after use, it may usually be left in the earth so as to be ready for biological decomposition in situ, or may alternatively be burnt without generating any toxic substance.

According to the present invention, a seedling pot for fruit crops may be molded using a mixture of boiled fibers of bamboo and Gramineae plant such as ditch reed, a supplementary component and urea as an additive. The supplementary component preferably blended with a palm product may be composed of at least one material selected from the group consisting of a carbonized plant material obtained by heating a nonwoody plant, a calcium-rich waste powder such as powdered bones and powdery foul droppings. From another aspect, the invention provides a seedling pot for fruit crops may be molded using another mixture of boiled fibers of bamboo and Gramineae plant such as ditch reed, a supplementary component, and urea and a silicon dioxide powder as additives. The supplementary component preferably blended with a palm product may also be composed of at least one material selected from the group consisting of a carbonized plant material obtained by heating a nonwoody plant, a calcium-rich waste powder such as powdered bones and powdery foul dropping.

In the preferred embodiments, the principal plant material is the mixture of boiled fibers composed of about 10 to 20% by weight of a bamboo fiber originating from bamboo stems, branches, skins and/or cores, and about 50 to 60% (preferably about 60%) by weight of a ditch reed. The supplementary component preferably blended with the palm product serving as a kind of enzyme in said mixture may also comprise the carbonized plant material obtained by roasting a non-woody plant such as buckwheat chaff, tea dregs, seedcake, coffee grounds or the like. The supplementary component may further or instead comprise a calcium-rich waste such as powdered bones or carapace, and/or foul droppings. About 30% by weight of such supplementary component is blended with the mixture of boiled fibers, and about 5% by weight of urea is added thereto so as to provide a finished raw material for use to mold the seedling pot. The coffee grounds need not be roasted again. Such a finished mixture will be heated and compressed in a mold at a temperature of 180° C. or higher, preferably about 200° C., at a pressure of about 3 kg/cm$^2$ and for about 25 sec. The molding process does not need any binder such as a sizing agent that is generally used in the paper-making mills, because hydrogen bonds acting between the fibers will firmly adjoin them together to give a desired shape to the pot thus molded. Instead of direct thermal compression in the mold of a desired cavity shape, the mixture of boiled bamboo fiber and ditch reed fiber, carbonized plant material, urea and silicon dioxide powder may primarily be suspended in water to form a slurry. This slurry will then be filtered through a paper-making screen, before thermally pressed in a mold. The antibacterial property of bamboo fiber is diminished in the present invention due to the boiling of this fiber so that the lateral roots of a seedling are allowed to extend towards the peripheral wall of a seedling pot. Consequently, the epigeous organs such as stem and leaves of this seedling will also grow well, thereby producing an excellent fruit crop seedling.

By virtue of spontaneous and biological decomposition of the pots in the earth they need no longer be removed when the seedlings are transplanted. Labor consumption for transplantation will thus be saved as compared with the case of using the conventional plastics pots. The carbonized material contained in the pot wall will provide a noticeable amount of carbon to react with urea so that nitrogen and/or its compounds produced. Such reaction products will serve as nutritive substances, together with the admixed calcium-rich waste powder or foul droppings.

Silicon dioxide (usually quartz, $SiO_2$) may be added to the described composition of seedling pots in order to enable repeated cultivation of the same crop on the same ground. It has been reported that *Fusarium* bacteria would cause putrefaction of watery soil fractions, resulting in inhibition of said repeated cultivation. However, the added silicon dioxide powder will induce wave propagation through the water in soil fractions, thereby protecting them from putrefaction.

Figure 7:
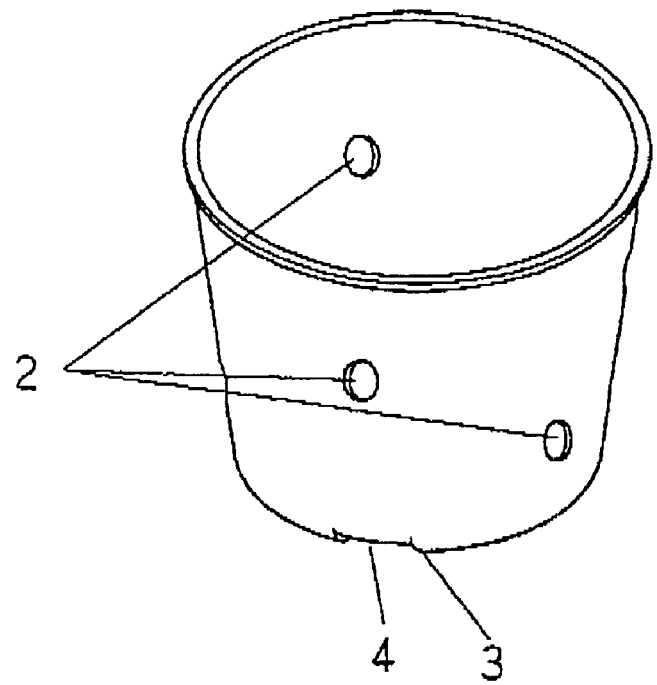
Figure 8:
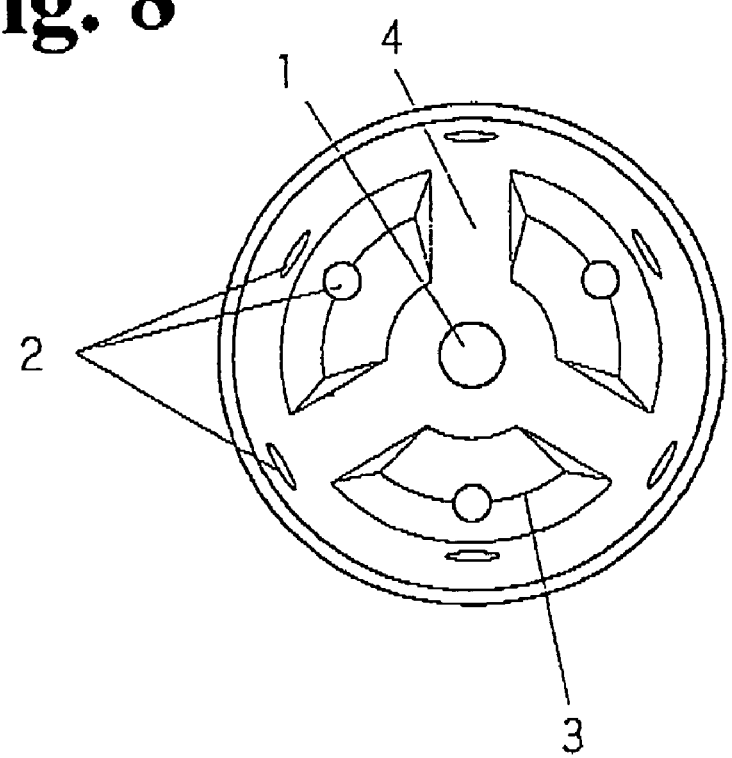

Similarly to the conventional flowerpots, the seedling pot as molded above may have through its bottom a central drainage hole (1). The seedling pot will be biologically decomposed in about two months, if left in the ground. This period will generally correspond to a time lapse from transplantation to the point of time when the pot's periphery start to interfere with the lateral roots growing sideways. Length of such a time lapse does naturally depend on the sorts of crops, and perforations (2) formed in and through the periphery of seedling pot will be useful to expedite biological decomposition thereof. The number of such perforations may typically be one or more, and 12 (twelve) or more or less. About 2% by weight of a water repellent may be added to the composition of said pot so as to retard biological decomposition by a few or several months. Such a prolonged life of pot in the ground will be convenient to cultivation of bulbous crops or to any grafted plants that are to be temporarily protected with a covering-up soil.

The seedling pot provided herein for raising root crops will autonomically vary its moisture content within a wide range of 7 to 25%. If ambient humidity rises, then the pot will absorb moisture, tending to lower its humidity. If contrarily ambient humidity descends, then the pot will desorb moisture, tending to increase its humidity. By virtue of such an autonomical control of humidity, this pot will adjust itself to a temporary ambient dryness during usage for raising seedlings. Further the seedling pot of the invention is superior to the polyvinyl chloride pots in its property of keeping warmth (18° C.–10° C.) making itself suited for use in cold zones.

The raw materials used herein to produce the seedling pot of the invention have been useless wastes, so that such cheaper materials will lower manufacture cost. Even if the pots have to be thrown away after use, they can be burnt at such lower temperatures that any trash burner or the like will neither be injured, nor generating any amount of dioxines. In a case wherein the used pots are left in the grounds, they will be biologically decomposed by bacteria and/or enzymes to thereby give certain nutritive compounds, thus contributing to soil improvement and environment purification.

BRIEF DESCRIPTION OF THE DRAWINGS

FIG. 1 is a perspective view of a seedling pot provided in a first embodiment of the invention, the pot being designed for use to raise root crop seedlings;

FIG. 2 is a plan view of the seedling pot shown in FIG. 1;

FIG. 3 is a front elevation of the seedling pot shown in FIG. 1;

FIG. 4 is a perspective view of the seedling pot as shown in FIG. 1 and in use;

FIG. 5 is a perspective view of a seedling pot provided in a second embodiment of the invention, the pot also being designed for use to raise root crop seedlings;

FIG. 6 is a plan view of the seedling pot shown in FIG. 5;

FIG. 7 is a perspective view of a seedling pot provided in a third embodiment of the invention, the pot being likewise designed for use to raise root crop seedlings; and FIG. 8 is a plan view of the seedling pot shown in FIG. 7.

BEST MODES OF CARRYING OUT THE INVENTION

Now, the first embodiment of the present invention will be described referring to FIGS. 1 to 4. A material mixture for molding and constituting the pot is composed of about 10% by weight of boiled bamboo fiber, about 60% by weight of boiled ditch reed fiber, and about 10% by weight of roasted and carbonized buckwheat chaff, tea dregs and the like. This mixture further contains 10% by weight of powdered bones, and 10% by weight of foul droppings (dried to a humidity of 12% or less), and 5% by weight of urea is added to such a mixture, before it is molded at about 200° C., at a pressure of about 3 kg/cm$^2$ for about 25 sec. Hydrogen bonds cause these fibers to firmly stick one to another to give a molded piece of the shape as a seedling pot. The seedling pot of the first embodiment resembles a flowerpot, and has in its bottom a central drainage hole 1, outward protrusions 3 and grooves 4 in communication with the hole. The protrusions 3 and grooves 4 alternating therewith are arranged in horizontal directions, radially and outwardly from the central hole 1. This pot has 8 (eight) perforations 2 in its periphery, and one in each of three radial outward grooves 4, thus the total number of those perforations is 11 (eleven). In manufacture, a primary molding step will produce a circular flash continuing from a rim around the open top of this pot. Therefore, a secondary molding step will be conducted to remove such a flash and form at the same time the central hole and the perforations. FIGS. 1 to 3 show the appearance of this seedling pot, with FIG. 4 illustrating it in use and a seedling planted and growing therein.

In a second embodiment as shown in FIGS. 5 and 6, about 10% by weight of waste fibers of bamboo stems, branches, skins and/or cores is admixed with about 60% by weight of ditch reed fiber, and they are boiled to provide a base material. About 20% by weight of a carbonized plant material prepared by roasting buckwheat chaff and 10% by weight of an oil cake are blended with the base material so as to give an interim mixture. This mixture is then stirred in water within a dissolver so as to provide a suspension, before about 2% by weight of urea as well as about 3% bt weight of a palm product will be blended therewith to give a molding composition. A paper-making screen is used to form from this composition a web that is then molded at about 200° C., at a pressure of about 3 kg/cm$^2$ for about 25 sec. A seedling pot thus obtained as shown in FIGS. 5 and 6 has only in its periphery 12 (twelve) perforations 2. Although the kinds of raw materials and the conditions for molding same do differ from those in the first embodiment, the seedling pot of the second embodiment does nevertheless have a structure and show its performance, both within a scope of the present invention.

In a third embodiment shown in FIGS. 7 and 8, about 10% by weight of bamboo fiber is mixed with about 60% by weight of ditch reed are used to prepare a boiled fiber component. Added to this component are: about 15% by weight of roasted and carbonized buckwheat chaff, 10% by weight of a shell powder and 5% by weight of dried powder of foul droppings, so as to give an interim mixture. This mixture is further blended with about 5% by weight of urea as well as 3% by weight of quartz powder (viz., silicon dioxide), before molded in the same manner as in the first embodiment so as to shape a seedling pot as shown in FIGS. 7 and 8. 6 (six) perforations 2 are formed in the periphery and arranged in a staggered pattern, and one perforation is formed in each of the three protrusions 3 in bottom. Thus, the total number of perforations 2 in this case is 9 (nine).

The invention claimed is:

1. A seedling pot for raising fruit crop seedlings, the pot being a molded piece formed of boiled fibers of bamboo and Gramineae plant, a supplementary component and urea as an additive, the supplementary component being blended with a palm product and comprising at least one material selected from the group consisting of a carbonized plant material, a calcium-rich waste powder and powdery foul droppings.

2. A seedling pot for raising fruit crop seedlings, the pot being a molded piece formed of boiled fibers of bamboo and Gramineae plant, a supplementary component, as well as urea and a silicon dioxide powder as additives, the supplementary component being blended with a palm product and comprising at least one material selected from the group consisting of a carbonized plant material, a calcium-rich waste powder and powdery foul droppings.

3. A seedling pot as defined in claim 1 or 2 further having a bottom and a periphery, wherein at least one perforation is formed in either of or both the bottom and periphery.

4. A seedling pot as defined in claim 1 or 2, wherein the carbonized plant material is made from at least one member selected from the group consisting of buckwheat chaff, tea dregs, oil cakes, and coffee grounds.

5. A seedling pot as defined in claim 1 or 2, wherein the calcium-rich waste powder is made from at least one member selected from the group consisting of shells, bones, and carapaces.

6. A seedling pot as defined in claim 1 or 2, wherein the calcium rich waste powder comprises powdered bones.

* * * * *